(12) United States Patent
Havskjold et al.

(10) Patent No.: US 9,501,912 B1
(45) Date of Patent: Nov. 22, 2016

(54) HAPTIC FEEDBACK DEVICE WITH A ROTATING MASS OF VARIABLE ECCENTRICITY

(71) Applicant: Apple Inc., Cupertino, CA (US)

(72) Inventors: David G. Havskjold, Portola Valley, CA (US); Samuel B. Weiss, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 14/165,475

(22) Filed: Jan. 27, 2014

(51) Int. Cl.
*H04B 3/36* (2006.01)
*G08B 6/00* (2006.01)
*G06F 1/00* (2006.01)
*G06F 3/01* (2006.01)

(52) U.S. Cl.
CPC . *G08B 6/00* (2013.01); *G06F 1/00* (2013.01); *G06F 3/016* (2013.01)

(58) Field of Classification Search
CPC .................................. G06F 1/00; G06F 3/016
See application file for complete search history.

(56) References Cited

U.S. PATENT DOCUMENTS

| | | |
|---|---|---|
| 3,390,287 A | 6/1968 | Sonderegger |
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,245,734 A | 9/1993 | Issartel |
| 5,283,408 A | 2/1994 | Chen |
| 5,293,161 A | 3/1994 | MacDonald et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,587,875 A | 12/1996 | Sellers |

(Continued)

FOREIGN PATENT DOCUMENTS

| | | |
|---|---|---|
| CN | 101409164 | 4/2009 |
| DE | 19517630 | 11/1996 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — Shirley Lu
(74) *Attorney, Agent, or Firm* — Brownstein Hyatt Farber Schreck, LLP

(57) ABSTRACT

A haptic element having a rotating element at least partially fixed to the rotating shaft of a motor. The rotating element dynamically reconfigures its center of mass to provide at least a first concentric rotation state and second eccentric rotation state. The transition between the concentric state and the eccentric state may be at least partially defined by a threshold angular velocity of the rotating shaft of the motor. As the motor approaches the threshold, the rotating element may be concentrically aligned with the axis of rotation of the rotating shaft of the motor. Once the threshold is reached, the mass element may be eccentrically aligned with the axis of rotation, initiating an immediate and perceivable haptic feedback.

23 Claims, 12 Drawing Sheets

(56) References Cited

U.S. PATENT DOCUMENTS

| | | |
|---|---|---|
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,127,756 A | 10/2000 | Iwaki |
| 6,135,886 A | 10/2000 | Armstrong |
| 6,218,966 B1 | 4/2001 | Goodwin |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Suuronen |
| 6,444,928 B2 | 9/2002 | Okamoto et al. |
| 6,552,471 B1 | 4/2003 | Chandran et al. |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,022,927 B2 | 4/2006 | Hsu |
| 7,081,701 B2 | 7/2006 | Yoon et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,170,498 B2 | 1/2007 | Huang |
| 7,176,906 B2 | 2/2007 | Williams et al. |
| 7,182,691 B1 | 2/2007 | Schena |
| 7,194,645 B2 | 3/2007 | Bieswanger et al. |
| 7,218,310 B2 | 5/2007 | Tierling et al. |
| 7,219,561 B2 | 5/2007 | Okada |
| 7,253,350 B2 | 8/2007 | Noro et al. |
| 7,333,604 B2 | 2/2008 | Zernovizky et al. |
| 7,348,968 B2 | 3/2008 | Dawson |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,569,086 B2 | 8/2009 | Kikuchi et al. |
| 7,639,232 B2 | 12/2009 | Grant et al. |
| 7,675,253 B2 | 3/2010 | Dorel |
| 7,675,414 B2 | 3/2010 | Ray |
| 7,679,611 B2 | 3/2010 | Schena |
| 7,710,399 B2 | 5/2010 | Bruneau et al. |
| 7,732,951 B2 | 6/2010 | Mukaide |
| 7,742,036 B2 | 6/2010 | Grant et al. |
| 7,798,982 B2 | 9/2010 | Zets et al. |
| 7,868,489 B2 | 1/2011 | Amemiya et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,044,940 B2 | 10/2011 | Narusawa |
| 8,069,881 B1 | 12/2011 | Cunha |
| 8,077,145 B2 | 12/2011 | Rosenberg et al. |
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,174,372 B2 | 5/2012 | da Costa |
| 8,179,202 B2 | 5/2012 | Cruz-Hernandez et al. |
| 8,188,623 B2 | 5/2012 | Park |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,264,465 B2 | 9/2012 | Grant et al. |
| 8,270,114 B2 | 9/2012 | Argumedo et al. |
| 8,294,600 B2 | 10/2012 | Peterson et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,542,134 B2 | 9/2013 | Peterson et al. |
| 8,547,341 B2 | 10/2013 | Takashima et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,599,047 B2 | 12/2013 | Schlosser et al. |
| 8,599,152 B1 | 12/2013 | Wurtenberger et al. |
| 8,614,431 B2 | 12/2013 | Huppi et al. |
| 8,621,348 B2 | 12/2013 | Ramsay et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,686,952 B2 | 4/2014 | Pope et al. |
| 8,710,966 B2 | 4/2014 | Hill |
| 8,735,755 B2 | 5/2014 | Peterson et al. |
| 8,760,273 B2 | 6/2014 | Casparian et al. |
| 8,787,006 B2 | 7/2014 | Golko et al. |
| 8,798,534 B2 | 8/2014 | Rodriguez et al. |
| 8,857,248 B2 | 10/2014 | Shih et al. |
| 8,866,600 B2 | 10/2014 | Yang et al. |
| 8,928,621 B2 | 1/2015 | Ciesla et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,131,039 B2 | 9/2015 | Behles |
| 9,158,379 B2 | 10/2015 | Cruz-Hernandez et al. |
| 9,201,458 B2 | 12/2015 | Hunt et al. |
| 9,235,267 B2 | 1/2016 | Pope et al. |
| 9,274,601 B2 | 3/2016 | Faubert et al. |
| 9,325,230 B2 | 4/2016 | Yamada et al. |
| 9,357,052 B2 | 5/2016 | Ullrich |
| 2003/0210259 A1 | 11/2003 | Liu |

(56) References Cited

U.S. PATENT DOCUMENTS

| | | |
|---|---|---|
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao et al. |
| 2007/0099574 A1 | 5/2007 | Wang |
| 2007/0152974 A1 | 7/2007 | Kim et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2008/0291620 A1 | 11/2008 | DiFonzo et al. |
| 2009/0115734 A1 | 5/2009 | Fredriksson et al. |
| 2009/0128503 A1 | 5/2009 | Grant et al. |
| 2009/0135142 A1 | 5/2009 | Fu et al. |
| 2009/0167542 A1 | 7/2009 | Culbert et al. |
| 2009/0167702 A1 | 7/2009 | Nurmi |
| 2009/0167704 A1 | 7/2009 | Terlizzi et al. |
| 2009/0200880 A1* | 8/2009 | Mortimer ............ B06B 1/10 310/81 |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0267920 A1 | 10/2009 | Faubert et al. |
| 2009/0305744 A1 | 12/2009 | Ullrich |
| 2009/0313542 A1 | 12/2009 | Cruz-Hernandez et al. |
| 2010/0020036 A1 | 1/2010 | Hui et al. |
| 2010/0048256 A1 | 2/2010 | Huppi et al. |
| 2010/0053087 A1 | 3/2010 | Dai et al. |
| 2010/0089735 A1 | 4/2010 | Takeda et al. |
| 2010/0141606 A1 | 6/2010 | Bae et al. |
| 2010/0152620 A1 | 6/2010 | Ramsay et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0077055 A1 | 3/2011 | Hill |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0163985 A1 | 7/2011 | Bae et al. |
| 2011/0193824 A1 | 8/2011 | Modarres et al. |
| 2011/0203912 A1 | 8/2011 | Niu |
| 2011/0248948 A1 | 10/2011 | Griffin et al. |
| 2011/0260988 A1 | 10/2011 | Colgate et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0127088 A1 | 5/2012 | Pance et al. |
| 2012/0268412 A1 | 10/2012 | Cruz-Hernandez et al. |
| 2012/0274578 A1 | 11/2012 | Snow et al. |
| 2012/0327006 A1 | 12/2012 | Israr et al. |
| 2013/0063285 A1 | 3/2013 | Elias |
| 2013/0063356 A1 | 3/2013 | Martisauskas |
| 2013/0106699 A1 | 5/2013 | Babatunde |
| 2013/0120290 A1 | 5/2013 | Yumiki et al. |
| 2013/0124076 A1 | 5/2013 | Bruni et al. |
| 2013/0181913 A1 | 7/2013 | Cole et al. |
| 2013/0191741 A1 | 7/2013 | Dickinson et al. |
| 2013/0200732 A1 | 8/2013 | Jun et al. |
| 2013/0228023 A1 | 9/2013 | Drasnin et al. |
| 2013/0261811 A1 | 10/2013 | Yagi et al. |
| 2013/0300549 A1 | 11/2013 | Hill |
| 2013/0300590 A1 | 11/2013 | Dietz et al. |
| 2014/0002248 A1* | 1/2014 | Zawacki ............ G06F 3/016 340/407.1 |
| 2014/0082490 A1 | 3/2014 | Jung et al. |
| 2014/0091857 A1 | 4/2014 | Bernstein |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0061848 A1 | 3/2015 | Hill |
| 2015/0090572 A1 | 4/2015 | Lee et al. |
| 2015/0109215 A1 | 4/2015 | Puskarich |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |

FOREIGN PATENT DOCUMENTS

| | | |
|---|---|---|
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A3 | 12/2010 |
| EP | 2315186 | 4/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002102799 | 9/2002 |
| JP | 200362525 | 3/2003 |
| JP | 2004236202 | 8/2004 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| WO | WO 97/16932 | 5/1997 |
| WO | WO 01/59588 | 8/2001 |
| WO | WO 02/073587 | 9/2002 |
| WO | WO 03/038800 | 5/2003 |
| WO | WO 2006/057770 | 6/2006 |
| WO | WO 2007/114631 | 10/2007 |
| WO | WO 2008/075082 | 6/2008 |
| WO | WO 2009/038862 | 3/2009 |
| WO | WO 2009/068986 | 6/2009 |
| WO | WO 2009/097866 | 8/2009 |
| WO | WO 2009/122331 | 10/2009 |
| WO | WO 2009/150287 | 12/2009 |
| WO | WO 2010/085575 | 7/2010 |

(56) References Cited

FOREIGN PATENT DOCUMENTS

| WO | WO 2010/087925 | 8/2010 |
|---|---|---|
| WO | WO 2011/007263 | 1/2011 |
| WO | WO 2012/052635 | 4/2012 |
| WO | WO 2012/129247 | 9/2012 |
| WO | WO 2015/023670 | 2/2015 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

U.S. Appl. No. 14/841,582, filed Aug. 31, 2015, Morrell et al.
U.S. Appl. No. 14/928,465, filed Oct. 30, 2015, Bernstein.
Kim et al., "Tactile Rendering of 3D Features on Touch Surfaces," UIST '13, Oct. 8-11, 2013, St. Andrews, United Kingdom, 8 pages.
Astronomer's Toolbox, "The Electromagnetic Spectrum," http://imagine.gsfc.nasa.gov/science/toolbox/emspectrum1.html, updated Mar. 2013, 4 pages.
U.S. Appl. No. 15/068,038, filed Mar. 11, 2016, Bernstein.
U.S. Appl. No. 15/025,243, filed Mar. 25, 2016, Keeler.
U.S. Appl. No. 15/025,425, filed Mar. 28, 2016, Moussette et al.
U.S. Appl. No. 15/025,277, filed Mar. 27, 2016, Morrell et al.
U.S. Appl. No. 15/025,250, filed Mar. 25, 2016, Moussette et al.
U.S. Appl. No. 15/025,254, filed Mar. 25, 2016, Lubinski et al.
U.S. Appl. No. 15/091,501, filed Apr. 5, 2016, Puskarich.
U.S. Appl. No. 15/098,669, filed Apr. 14, 2016, Uttermann et al.
U.S. Appl. No. 15/102,826, filed Jun. 8, 2016, Smith et al.

\* cited by examiner

HAPTIC FEEDBACK DEVICE WITH A ROTATING MASS OF VARIABLE ECCENTRICITY

TECHNICAL FIELD

This disclosure relates to haptic devices and, more particularly, to haptic feedback elements providing short and distinct pulses.

BACKGROUND

Many electronic devices include haptic elements to provide feedback to a user. For example, an electronic device such as a cellular telephone may leverage haptic elements to inform a user of an incoming call. In some examples, a haptic element may provide feedback through sustained or intermittent vibration over a period of time. Electronic devices which may benefit from haptic elements may include cellular telephones, smart phones, personal digital assistants, tablet computers, laptop computers, track pads, wearable devices, health devices, sports accessory devices, peripheral input devices, and so on.

Most haptic elements include an eccentric mass coupled to the rotating axis of an electric motor. When the motor rotates the eccentric mass about a shaft or other axis the haptic element typically experiences axially asymmetric forces, displacing the mass within a plane perpendicular to the axis of rotation. After reaching a sufficient angular velocity, the displacement of the mass may be perceived as a sustained vibration.

In other cases, a haptic element may be repeatedly activated and deactivated to simulate a pulsed vibration. Many haptic elements are structurally coupled to the housing of an electronic device, such that when the haptic element is activated, the electronic device housing vibrates.

In certain examples, the time required for the motor to reach the speed necessary for vibration to be perceptible (e.g., spin-up delay) may be distracting, confusing or frustrating to a user, even if the delay is minimal. In addition, a spin-up delay may undesirably limit the frequencies at which a haptic element may be pulsed. In still further examples, an eccentric mass haptic element may perceivably vibrate before reaching a maximum vibration intensity. In such a case, a user may perceive a haptic feedback of progressive intensity instead of a distinct and well-characterized haptic feedback.

Accordingly there may be a present need for an improved haptic element.

SUMMARY

Embodiments described herein may include or take the form of haptic elements which dynamically realign the center of mass of a rotating element to provide distinct and well-characterized haptic feedback.

Certain embodiments may include or take the form of a haptic element with a motor having a mass element coupled thereto. As the motor begins spinning, the mass may be positioned such that the center of mass of the mass element is aligned with the axis of rotation of the rotating shaft of the motor. Once the motor reaches a certain angular velocity (i.e., speed of rotation), the center of mass of the mass element may dynamically become eccentrically aligned with the rotating shaft of the motor. As a result of the sudden eccentricity of the mass, the element may immediately and perceivably vibrate.

Further embodiments described here may divide a mass element into a plurality of portions. In one example, a first mass portion and a second mass portion may be included. In these and related embodiments, the first mass portion may be rigidly coupled to the shaft whereas the second mass portion may be configured to move outwardly from the shaft or, alternately configured to pivot about the shaft.

In these and related embodiments, the first operational mode (i.e., concentric alignment) may position the second mass portion to interface the first mass portion along the shaft and the second operational mode (i.e., eccentric alignment) may position the second mass portion a select distance from the shaft and first mass portion. This positioning may result in a displacement of the center of mass of the mass element with respect to the axis of rotation. The second mass portion may transition between the first and second operational modes along a path at least partially defined by a movable coupling such as a spring, elastomer, electromagnet, permanent magnet, or piston. In other cases, the distance may be defined at least in part by an outward motion limiter such as a band, basket, or hoop.

In further embodiments, the haptic element may enjoy a third operational configuration. For example, once a selected angular velocity range is reached to transition the mass element from concentric alignment to eccentric alignment, a first mass portion may itself transition a distance from the shaft equal to the distance traveled by the second mass portion. In this manner, the first mass portion may become diametrically opposite to the second mass portion about the shaft. In such a configuration, the center of mass of the mass element may return to concentric alignment with respect to the axis of rotation of the motor.

Other embodiments described herein may relate to or take the form of a haptic feedback apparatus including a mass element coupled to a driver motor that may assume both a haptic and a nonhaptic mode. For example, a nonhaptic mode may be associated with a particular angular velocity range of the driver motor, and a haptic mode associated with a threshold angular velocity of the driver motor. In some cases the threshold angular velocity may define the upper bound of the angular velocity range associated with the nonhaptic mode.

Still further embodiments may relate to or take the form of an electronic device may include a housing having a haptic element coupled thereto and may include a motor may include a shaft, and a mass element coupled to the shaft may include a first operational configuration associated with a first angular velocity range of the shaft in some cases the center of mass of the mass element may be concentrically aligned with the shaft, and a second operational configuration associated with a second angular velocity range of the shaft in some cases the center of mass of the mass element may be eccentrically aligned with the shaft.

Still further embodiments discussed herein may relate to or take the form of a method of providing haptic feedback comprising spinning a motor to a first angular velocity, the motor comprising a shaft coupled to a mass element, the mass element concentrically aligned with the shaft, and causing the mass element to eccentrically align with the shaft upon spinning the motor to a second angular velocity.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Figure 1:
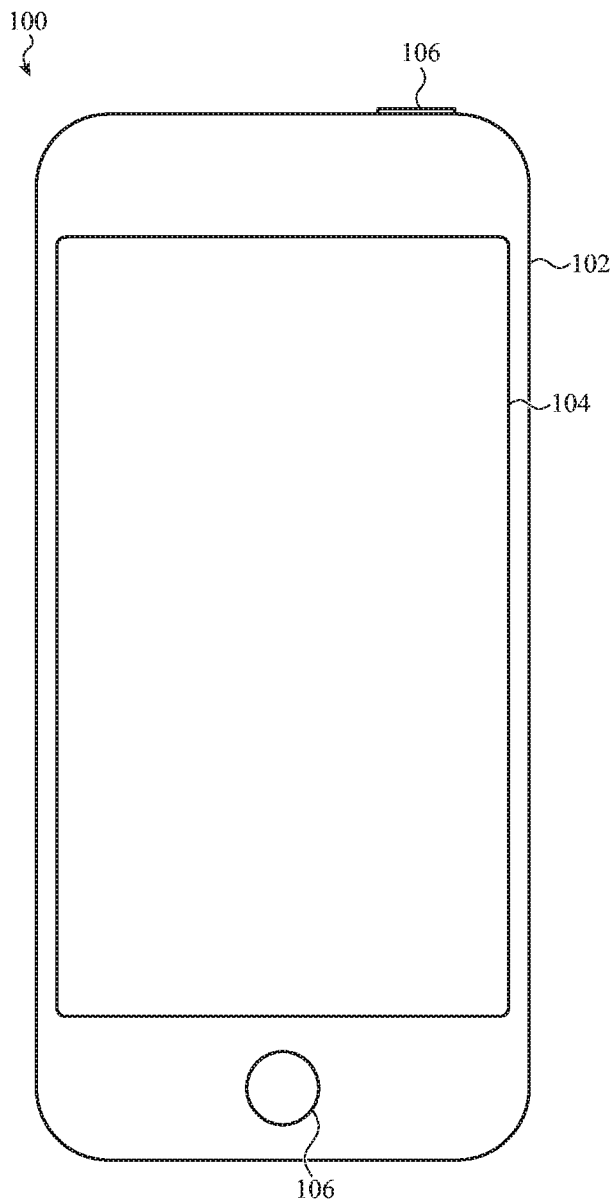
FIG. 1 is a sample electronic device including a haptic element having a rotating mass of variable eccentricity.

Embodiments discussed herein may take the form of a rotatable haptic element having a dynamically-realigned center of mass. In many embodiments, the haptic element may be attached to the shaft of a motor. The haptic element may include a mass element that may be separabley multi-part. For example, as the motor begins spinning, the haptic element may be positioned such that the center of mass of the mass element is aligned with the axis of rotation of the shaft of the motor. In this manner, the haptic element is axially balanced and may spin without perceivably vibrating.

Once the motor reaches a certain angular velocity, the center of mass of the h element may dynamically realign with respect to the rotating shaft of the motor such that the mass element spins eccentrically. When the motor rotates the eccentric mass it typically experiences axially asymmetric forces, displacing the mass within a plane perpendicular to the axis of rotation. The rapid displacement may cause a vibration in the housing. In other words, as a result of the sudden eccentricity of the mass, the haptic element and the electronic device housing may immediately and perceivably vibrate.

In certain examples the mass element may include two distinct parts. For example, the mass element may take the form of a cylinder that is diametrically divided into two parts. A first of the two equal parts may be rigidly affixed to the rotating shaft of the motor. A second of the two equal parts may be movable to a certain distance in a direction at least partially perpendicular to the axis of rotation. Movement of the movable second part may be controlled or guided. For example, a retractable extension may control the separation of the movable second part from the fixed first part along a rectilinear or arcuate path to a certain distance away from the axis of rotation.

In some examples, the movement of the movable second part may be defined at least in part by an outward motion limiter such as a band, basket, or hoop. For example, a hoop or basket attached to the fixed first part and positioned at a certain distance outwardly from the shaft may catch the movable second mass as it extends outwardly from the shaft.

In some embodiments, the movement of movable second part may be forcibly limited by a retaining feature. The retaining feature may be a spring, elastomer, electromagnet, permanent magnet, piston, and so on. In this manner, movement or displacement of the movable element may require a selectable or configurable amount of force.

In one embodiment, a spring under tension may forcibly hold the two mass elements together to clasp the shaft of the motor. As the motor and spring-clasped portions of the mass element rotate at increasing angular velocity, the retaining force exerted on the mass element by the spring may be overcome by the centrifugal force resulting from the circular path of the mass element. Once the retaining force is overcome, the movable mass element may extend outwardly from the shaft, thus shifting the center of mass of the mass element away from the axis of rotation of the shaft. In other words, once the two-part mass element retained together by a spring reaches a certain angular velocity, one part may move outward causing an off center mass with respect to the shaft and thus eccentric rotation of the mass element.

In certain examples, this eccentricity may reduce the angular velocity of the motor. In some cases, the reduction in the angular velocity of the motor as a result of the eccentricity may cause the retaining element (e.g., spring) to overcome the centrifugal force, resulting in the movable portion retracting back into the concentric position after a brief period of eccentricity. In this manner, a short and well-characterized haptic pulse may be perceived. In certain examples a short haptic pulse may provide a tapping or knocking sensation. In an alternate embodiment, the angular velocity of the motor may be maintained to prevent the reduction in speed as a result of sudden eccentricity in order to provide a sustained vibration.

In these and related embodiments, the haptic element may assume both a haptic and a nonhaptic mode.

In some embodiments, the haptic element may be included in a portable electronic device configured in the form of a cellular telephone. A processor within the portable electronic device may be coupled to the haptic element in order to provide haptic notifications or other indications to a user of the device. For example, the cellular telephone may be enabled to notify a user of an incoming telephone call and to separately notify a user of an incoming message. In some examples, the cellular telephone may desirably provide a series of short and distinct pulses to notify a user of the message and a long sustained vibration to notify a user of the phone call.

In other embodiments, the haptic element may be included in a portable electronic device configured in the form of a wearable health assistant that provides health-related information (whether real-time or not) to the user, authorized third parties, and/or an associated monitoring device. The health-related information or data may include, but may not be otherwise limited to heart rate data, blood pressure data, temperature data, oxygen level data, diet/nutrition information, medical reminders, health-related tips or information, or other health-related data. In one example, the wearable heath assistant may be configured to notify a user or a third party of a change in health-related information by providing a series of distinct pulses. In certain embodiments, an associated monitoring device may be, for example, a tablet computing device, phone, personal digital assistant, computer, and so on.

In one embodiment, the wearable health assistant may be configured to provide biofeedback. For example, a wearable health assistant may pulse at a rate based at least in part on or otherwise associated with a detected or target heart rate. In another example, the wearable health assistant may pulse at a rate based at least in part on or otherwise associated with a detected or target breathing rate. In another example, the wearable heath assistant may attempt to awaken a sleeping user at a particular time or after a particular duration with distinct haptic pulses of progressively increasing intensity or duration. In some examples, the wearable health device may be configured to monitor health-related data associated with the sleep cycle of user. In these and related embodiments the wearable health device may augment or determine an ideal time to begin attempting to wake a sleeping user.

In other embodiments, the haptic element may be included in a portable electronic device configured in the form of a peripheral input device associated with an associated device such as a computer mouse or track pad. The haptic element may be configured to provide haptic pulses or sustained vibrations in response to requests from a processor associated with the portable electronic device or, in alternative embodiments, from the associated device. The associated device may be, for example, a tablet computing device, phone, personal digital assistant, computer, and the like.

In further embodiments, more than one haptic element may be included in a portable electronic device. Each independent device may be configured to provide the same or different haptic feedback. For example, in one embodiment a first haptic element may enjoy an eccentric state defined at a first angular velocity and a second haptic element may enjoy an eccentric state defined at a second angular velocity. In these embodiments, certain notifications may be provided by the first haptic element and other notifications may be provided by the second haptic element. In other embodiments, both haptic elements may be operated at the same time, providing complementary haptic feedback. In still further embodiments, the first haptic element may be configured to provide feedback that either constructively or destructively interferes with the feedback provided by the second haptic feedback. For example, the eccentric states of the first and second haptic elements may be triggered at different angular velocity, which in turn may translate to different vibration frequencies.

In further embodiments, more than one set of mass elements may be coupled to the rotating axis of a mass element. In certain embodiments, multiple cylindrical mass elements (as one example, disks), each diametrically divided into equal pairs, may be positioned along the same axis. In this manner, at a first angular velocity the first of the multiple cylindrical mass elements may transition to an eccentric state. At a second and faster angular velocity the second of the multiple cylindrical mass elements may transition into an eccentric state. In this manner, the total mass eccentricity rotated about the shaft of the motor may be incrementally increased or decreased to correspondingly increase or decrease the haptic pulse effect. Accordingly, the haptic element may provide selectable intensity.

Reference will now be made to representative embodiments presented in the accompanying figures. It is understood that the following figures are not intended to limit the disclosure to one preferred embodiment but instead, to the contrary, it is intended to cover alternatives, modifications, and equivalents as may be included within the spirit and scope of the described embodiments as defined by the appended claims.

FIG. 1 is a sample electronic device 100 including a haptic element with a rotating mass of variable eccentricity. The electronic device 100 may, for example, be embodied as a portable or handheld electronic devices, such as a smart phone having a housing 102 and a display area 104 that consumes a majority if not all of the front surface of the electronic device 100. The electronic device may include one or more physical buttons 106 that a user may engage to interact with the electronic device 100.

The display area 104 of electronic device 100 may be embodied in a variety of ways. In one example, the display area 104 consists of at least a display such as a flat panel display such as, for example, a liquid crystal display or a thin film transistor display. The display area 104 may additionally include a cover window that is positioned over a display to provide additional structural support and scratch resistance. A haptic element, as described herein, may be structurally coupled to the housing 102 such that when the haptic element vibrates, a user may perceive the electronic device 100 to vibrate.

Figure 2:
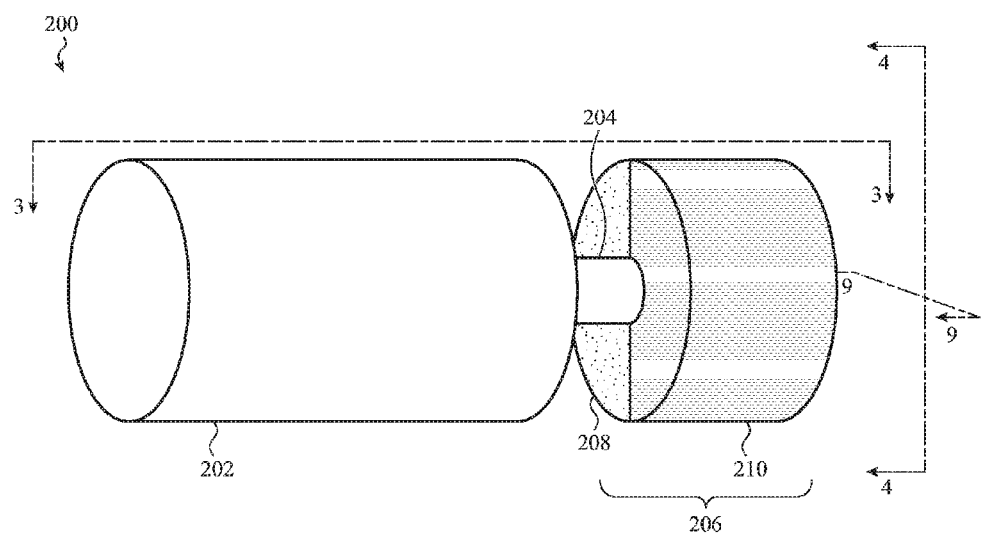
FIG. 2 is an isometric side view of a sample haptic element having a rotating mass of variable eccentricity.

FIG. 2 is an isometric side view of a sample haptic element 200 having a rotating mass of variable eccentricity. The haptic element 200 includes a rotating actuator 202 having a shaft 204 extending at least partially therefrom. The shaft 204 may be rotated through a range of speeds by the rotating actuator 202. In certain embodiments, the rotating actuator may be an electric motor and the shaft 204 may extend from the central axis of the motor.

Coupled to the shaft 204 is a mass element 206. The mass element 206 may have a cylindrical or substantially cylindrical shape that is axially aligned with the shaft 204. The mass element 206 may be diametrically divided into two equal or substantially equal portions, shown as the mass portions 208 and 210. In further embodiments, the mass elements may not necessarily be diametrically divided into equal parts. For example, in one embodiment, one or more mass portions may be defined by a chord smaller than the diameter of a cylinder. In still further embodiments, one or more mass portions may be defined by an angular segment of a cylinder. In still further embodiments the mass element may take a non-cylindrical shape.

Figure 3A:
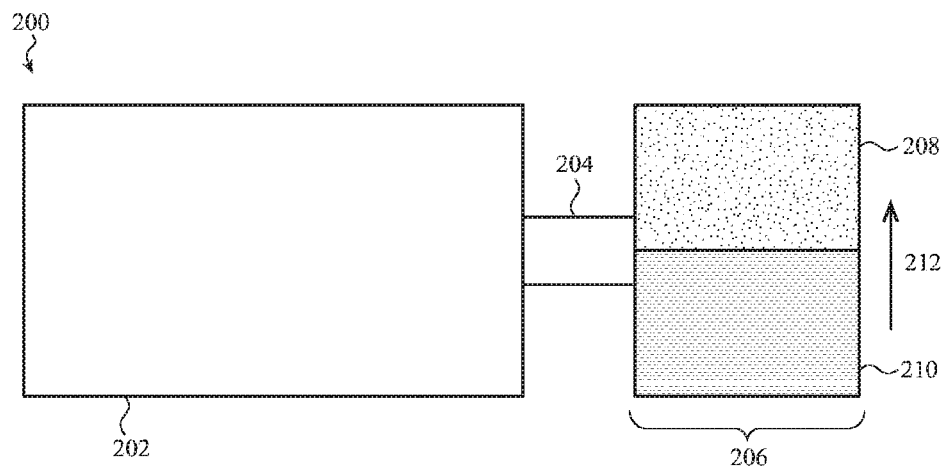
FIG. 3A is a top plan view of the sample haptic element of FIG. 2 taken along line 3-3, showing a rotating mass in an axially balanced state.

As illustrated, the mass portions 208 and 210 are positioned to clasp around the shaft 204 such that when the shaft 204 and mass element 206 rotate in a first direction 212, such as shown in FIG. 3A, the mass element 206 is balanced about the axis of rotation.

In many embodiments, the positioning of the mass elements 208 and 210 define a center of mass of the mass element 206. One may appreciate that the center of mass of an object of uniform density is the geometric centroid of the object. For example, the center of mass of a sphere of uniform density is the exact center of the sphere. In another example, the center of mass of a cylinder of uniform density is a point along the major axis of the cylinder at the midpoint of the cylinder's height. Throughout this disclosure, it is presumed that elements are of uniform density such that the center of mass is equal to the geometric centroid. However, one may appreciate that uniform density or uniform distributions of mass are not required and that multiple distributions of mass are contemplated. As illustrated, one may appreciate that the center of mass of the mass element 206 is located along the axis of the shaft 204. In this manner, as the shaft 204 and mass element 206 do not vibrate or displace with respect to the axis of rotation as the rotating actuator 202 increases rotational speed.

Figure 3B:
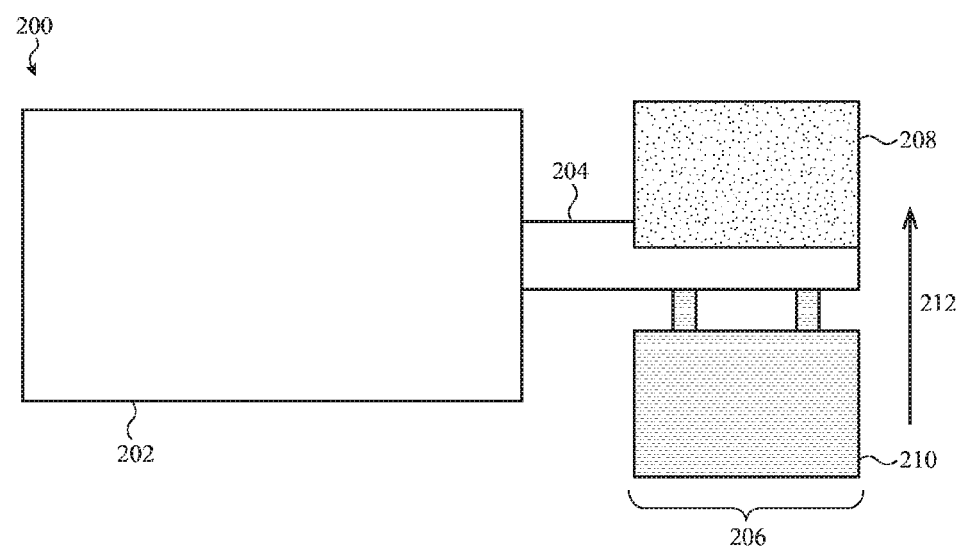
FIG. 3B is a top plan view of the sample haptic element of FIG. 2 taken along line 3-3, showing a rotating mass in an eccentric state.

FIG. 3A is a top plan view of the sample haptic element of FIG. 2 taken along line 3-3, showing a rotating mass in an axially balanced state. As with FIG. 2, the haptic element 200 includes a rotating actuator 202 having a shaft 204 to which the mass element 206 and the respective mass portions 208, 210 are coupled. FIG. 3A shows the mass element 206 rotating in a first direction 212 at a first angular velocity, illustrated generally by the magnitude of the arrow identifying the first direction 212 of rotation. As the angular velocity of the rotating actuator 202 increases, the mass portions 208, 210 also rotate about the shaft at increasing angular velocity. At a certain angular velocity, the mass portion 210 may extend outwardly from the axis of rotation of the shaft 204, as shown in FIG. 3B.

One may appreciate that in this configuration, the center of mass of the mass element 206 shifts outwardly in response to the outward movement of the mass portion 210. In this manner, the center of mass of the mass element 206 is not aligned with the axis of rotation or, in other words, the mass element 206 may assume an eccentric alignment. As a result of the eccentric alignment, the mass element 206 may experience axially asymmetric forces, which encourages the displacement of the mass element 206 within a plane perpendicular to the axis of rotation of the shaft 204.

Figure 4A:
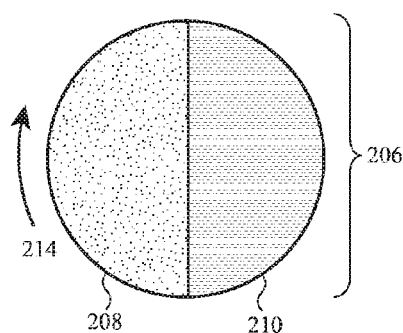
FIG. 4A is a side plan view of the sample haptic element of FIG. 2 taken along line 4-4, showing a rotating mass in an axially balanced state rotating at a first angular velocity.
Figure 4B:
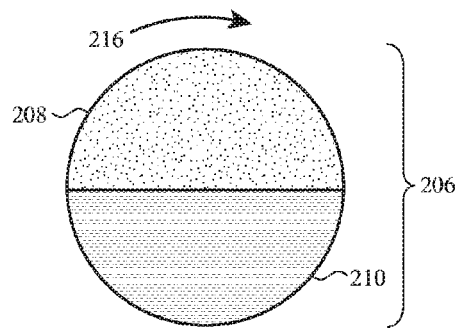
FIG. 4B is a side plan view of the sample haptic element of FIG. 2 taken along line 4-4, showing a rotating mass in an axially balanced state rotating at a second angular velocity.
Figure 4C:
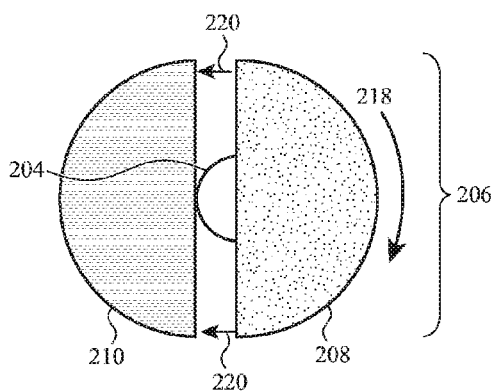
FIG. 4C is a side plan view of the sample haptic element of FIG. 2 taken along line 4-4, showing a rotating mass in a transition state between an axially balanced state and an eccentric state, rotating at a third angular velocity.
Figure 4D:
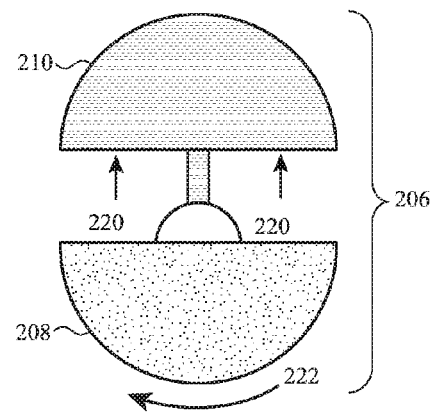
FIG. 4D is a side plan view of the sample haptic element of FIG. 2 taken along line 4-4, showing a rotating mass in an eccentric state, rotating at a fourth angular velocity.

FIG. 4A is a side plan view of the sample haptic element 200 of FIG. 2 taken along line 4-4, showing the mass element 206 in an axially balanced state rotating at a first angular velocity 214. As the angular velocity continues to increase to a second angular velocity 216, as shown in FIG. 4B, the mass element 206 may remain balanced. However, as the angular velocity continues to increase to a third angular velocity 218 as shown in FIG. 4C, a centrifugal force 220 may act to move the mass portion 210 outwardly with respect to the shaft 204. As the angular velocity continues to increase to a fourth angular velocity 222 as shown in FIG. 4D, the centrifugal force 220 may act to retain the mass portion 210 in an eccentric state.

Figure 5A:
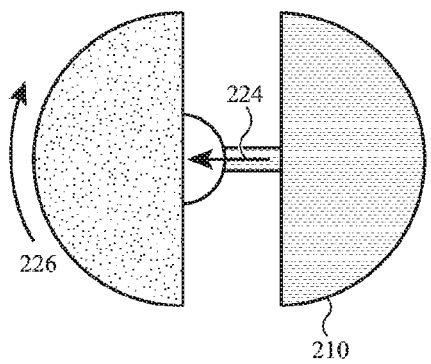
FIG. 5A is a side plan view of the sample haptic element of FIG. 2 taken along line 4-4, showing a rotating mass in an eccentric state, rotating at a first angular velocity.
Figure 5B:
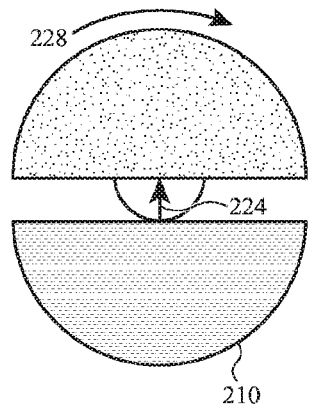
FIG. 5B is a side plan view of the sample haptic element of FIG. 2 taken along line 4-4, showing a rotating mass in a transition state between an eccentric state and an axially balanced state, rotating at a second angular velocity.
Figure 5C:
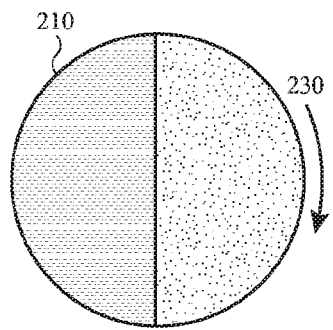
FIG. 5C is a side plan view of the sample haptic element of FIG. 2 taken along line 4-4, showing a rotating mass in an axially balanced state rotating at a third angular velocity.
Figure 5D:
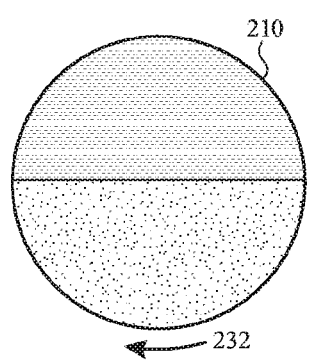
FIG. 5D is a side plan view of the sample haptic element of FIG. 2 taken along line 4-4, showing a rotating mass in an axially balanced state rotating at a fourth angular velocity.

In many embodiments, the transition of the mass element 206 from a concentric alignment to an eccentric alignment may correspondingly increase the torque required to maintain the angular velocity of mass element 206 at the fourth angular velocity 222. In certain embodiments, the power supplied to the rotating actuator may be increased. In other embodiments, the increase in torque may correspond to a decrease in the angular velocity of mass element 206. The reduction in angular velocity may correspondingly decrease the centrifugal force retaining the mass portion 210 in the eccentric state. As a result, as shown in FIG. 5A, a retaining force 224 may overcome the centrifugal force 220, acting to pull the mass portion 210 back toward the axis of rotation defined by the shaft 204. As the angular velocity continues to decrease, the retaining force may continue to pull the mass portion 210 toward the shaft 204, as illustrated in FIG. 5B. The angular velocity continues to decrease from angular velocity 226 in FIG. 5A to angular velocity 228 in FIG. 5B to angular velocity 230 in FIG. 5C to angular velocity 232 in FIG. 5D. In this manner, the mass portion 210 may once again be concentrically aligned with the axis of the shaft 204, as illustrated by FIGS. 5C and 5D.

Figure 6A:
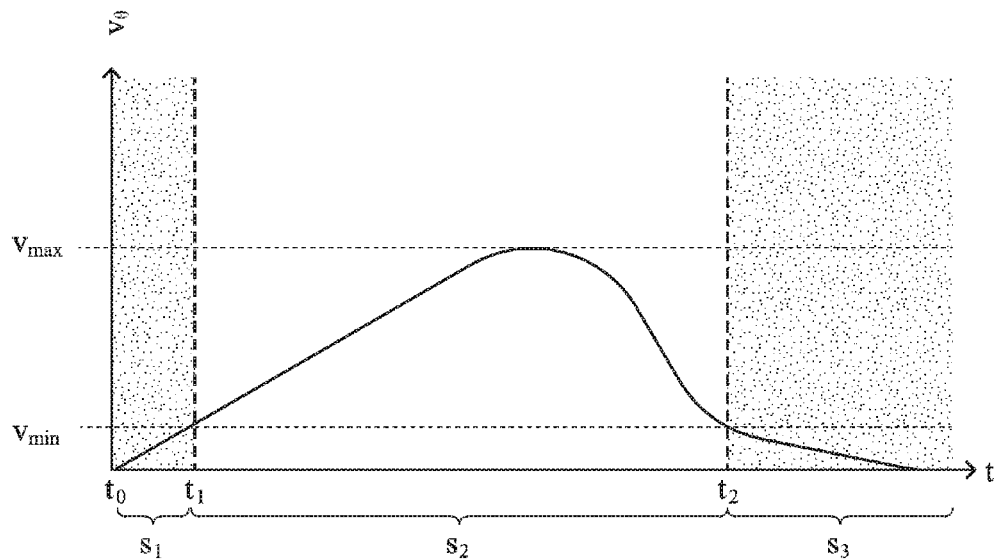
FIG. 6A is a sample graph illustrating exemplary angular velocity over time of a haptic element with a rotating mass of fixed eccentricity.

One may appreciate a haptic element having fixed eccentricity increase its vibration intensity by increasing the number of rotations per minute of the eccentric mass. For example, FIG. 6A illustrates a theoretical angular velocity $v_\theta$ of a haptic element with a rotating mass of fixed eccentricity. As shown, at time t0, the angular velocity of the haptic element may be equal to zero (i.e., the haptic element is at rest). From time t0 to t1, the haptic element may be in a first state s1, during which the angular velocity $v_\theta$ may increase. During s1, the angular of the haptic element at time t1 may be insufficient to cause a user-perceivable vibration. In other words, the haptic element may be spinning too slowly for a user to perceive the spin as a vibration. In some examples, this period may be referred to as the "spin-up" time.

At time t1, the angular velocity may be of sufficient magnitude to be perceived as a vibration by a user. As time passes, the angular velocity $v_\theta$ may increase. In other words, the haptic element may spin faster and faster. In other words, at t1 as user may feel a vibration of increasing intensity. At a certain point, the haptic element may no longer be able to spin faster. At this point, the haptic element has reached a maximum angular velocity $v_{max}$. In some examples, the limit may be defined by the amount of power supplied to the haptic element. In other examples, the limit may be defined by one or more physical properties of the haptic element. In still further examples, the limit may be defined by software operating on the electronic device controlling the haptic element.

The haptic element may stay at the maximum angular velocity $v_{max}$ for a period of time before power to the haptic element is turned off. Once power is turned off, one may appreciate that the haptic element may begin to slow, decelerating into state s3, the point at which a user may no longer perceive the haptic element to vibrate.

In this manner, the maximum vibration intensity of a haptic element having a fixed-eccentricity spinning mass may be correlated with the maximum angular velocity. As shown in FIG. 6A, a period of time may be required for the maximum angular velocity to be reached. As a result, a user may perceive a haptic feedback of progressive intensity instead of a distinct and well-characterized haptic feedback.

Figure 6B:
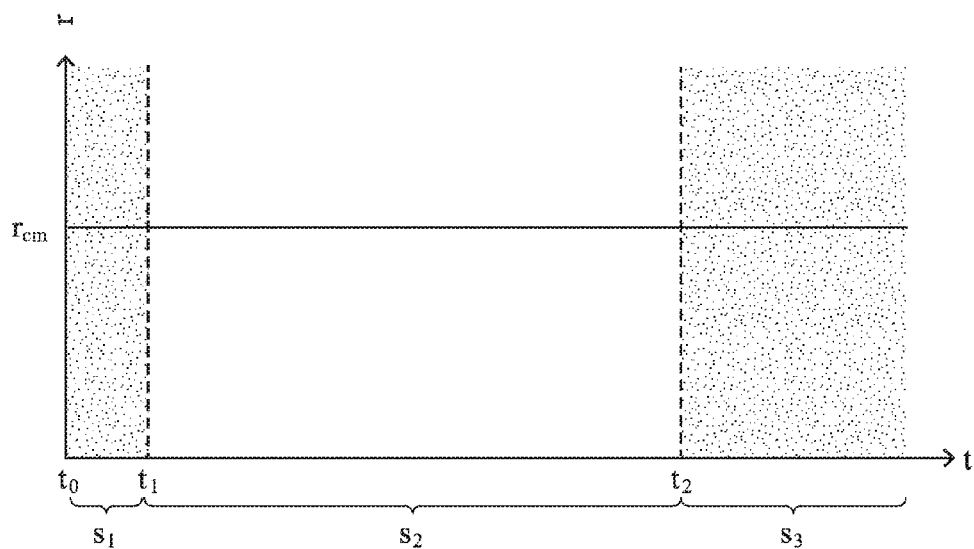
FIG. 6B is a sample graph illustrating a sample coordinate of the center of mass of the haptic element with a rotating mass of fixed eccentricity partially described with respect to the sample graph shown in FIG. 6A.

Corresponding to FIG. 6A, FIG. 6B shows the radius $r_{cm}$ of the center of mass of the haptic element with a rotating mass of fixed eccentricity. As the eccentricity of the rotating mass is fixed, the radius of the center of mass does not change.

Figure 7A:
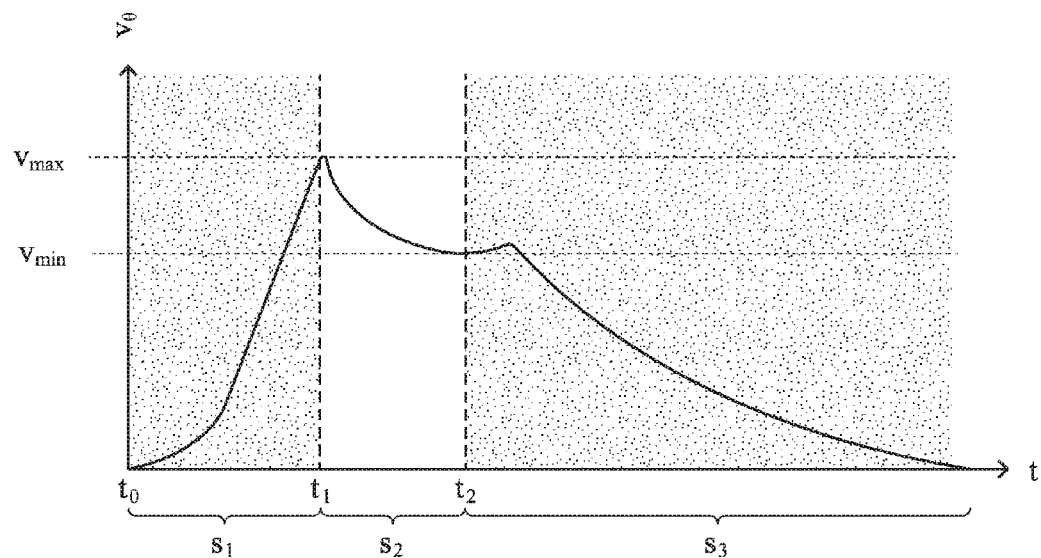
FIG. 7A is a sample graph illustrating exemplary angular velocity over time of a haptic element with a rotating mass of variable eccentricity.

FIG. 7A is a sample graph illustrating exemplary angular velocity over time of a haptic element with a rotating mass of variable eccentricity. FIG. 7A illustrates a theoretical angular velocity $v_\theta$ over time of a haptic element with a rotating mass of variable eccentricity, such as the haptic element shown in FIG. 4A. At time t0, the angular velocity of the haptic element may be equal to zero because the haptic element is at rest and is not yet spinning. From time t0 to t1, the haptic element may be in a first state s1. In this state, the rotating mass may be balanced (e.g., FIG. 4A) such that the center of mass of the rotating mass is centered about the axis of rotation. During the first state s1, the angular velocity may increase without causing the haptic element to become eccentric, as shown, for example, in FIG. 4B.

At time t1, the angular velocity of the haptic element may cause the separation of the mass element to an eccentric state. For example as shown in FIG. 4C and 4D, the mass element may separate in a direction perpendicular to the. Once the haptic element is eccentric, the haptic element may vibrate as it revolves off-axially about the shaft. The housing of the electronic device may also vibrate. In this manner, the rapid shift to an eccentric position (unbalanced) from a concentric position (balanced) may cause the haptic element to immediately slow due to the sudden increase in torque required to rotated the eccentric mass. This reduction in speed may occur within state s2.

At time t2, the angular velocity of the haptic element may be insufficient to maintain the eccentricity of the haptic element. As a result, the haptic element may reconfigure into the concentric position, as shown in FIGS. 5A and 5B. As a result of the shift to the concentric position, the haptic element may briefly increase in angular velocity as a result in the reduction in torque required to spin the concentric mass (i.e., conservation of angular momentum). In certain examples, this slight increase in the angular velocity may be below the amount required to shift the mass into the eccentric position.

Figure 7B:
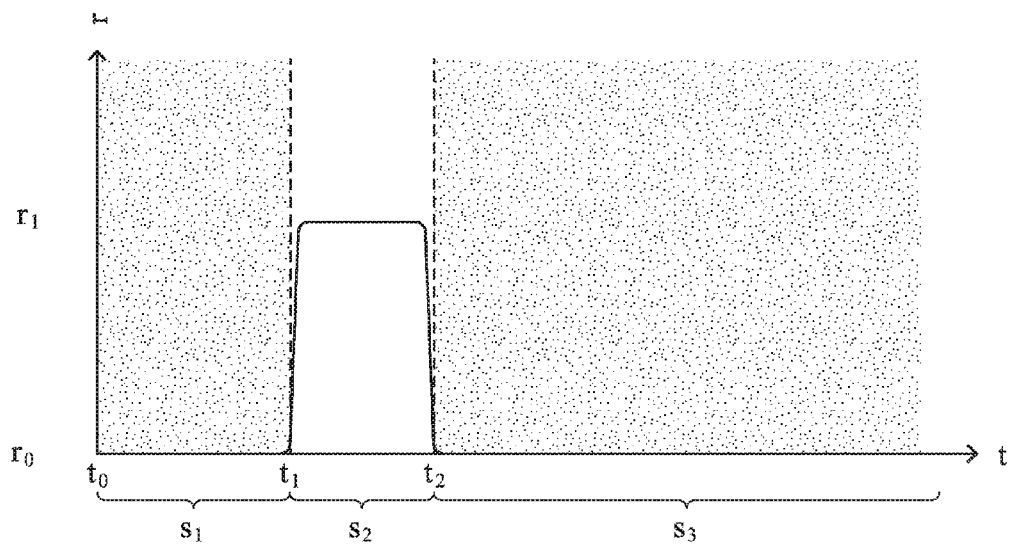
FIG. 7B is a sample graph illustrating exemplary coordinates of the center of mass of the haptic element with a rotating mass of variable eccentricity partially described with respect to the sample graph shown in FIG. 7A.

Corresponding to FIG. 7A, FIG. 7B shows the radius $r_0$ and r1 of the center of mass of the haptic element with a rotating mass of variable eccentricity. As shown, the center of mass of the haptic element have a radius equal to 0 when the mass is concentric with the axis of the rotating actuator element coupled thereto. Similarly at t1, the radius of the center of mass may immediately shift to r1. At t2, the radius of the center of mass of the haptic element may shift back to 0.

Figure 8A:
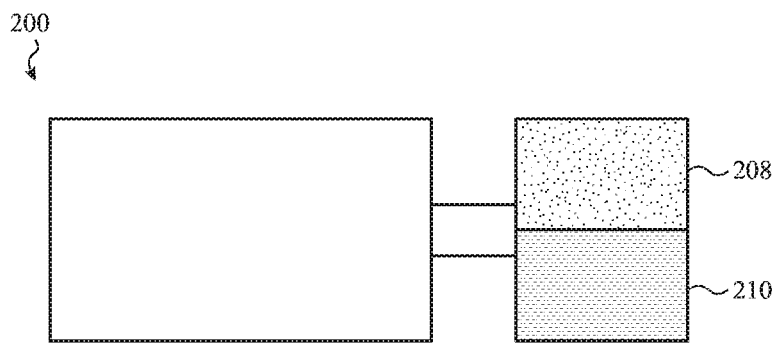
FIG. 8A is a top plan view of the sample haptic element showing two rotating masses, each in a first axially balanced state.
Figure 8B:
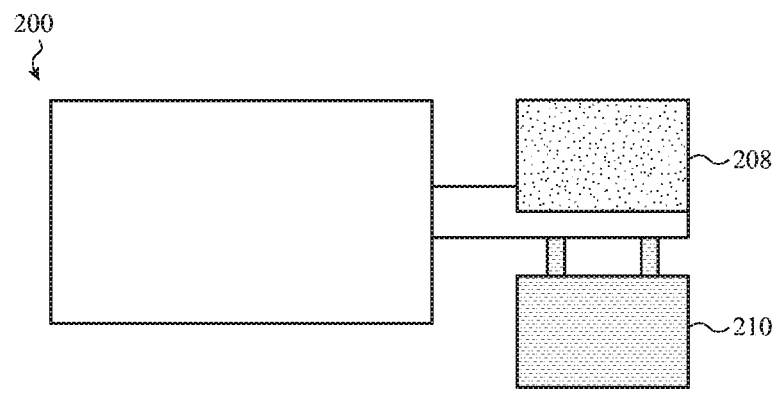
FIG. 8B is a top plan view of the sample haptic element showing two rotating masses in an eccentric state.
Figure 8C:
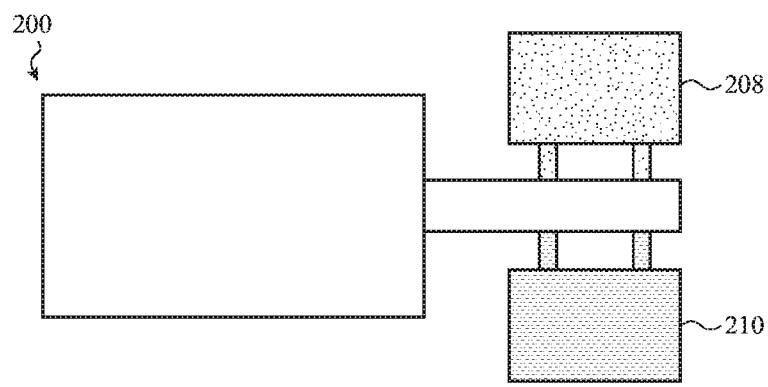
FIG. 8C is a top plan view of the sample haptic showing two rotating masses in a second axially balanced state.

Other embodiments described herein may relate to or take the form of a haptic element having a rotating mass with more than one eccentric state or more than one balanced state. For example, FIG. 8A shows a top plan view of the sample haptic element 200 of FIG. 2 taken along line 3-3, showing two rotating masses portions 208, 210 each in a first axially balanced state. Corresponding to a first angular velocity, the mass portion 210 may extend away from the central axis to become eccentric, as shown in FIG. 8B. As the angular velocity of the haptic element 200 continues to increase, mass portion 208 may also extend away from the central axis, as shown in FIG. 8C, forming a second axially balanced state. As the angular velocity of the haptic element 200 decreases, each of the mass portions 208 may retract into the concentric position.

Other embodiments described herein may relate to or take the form of a retaining element or retaining features for use within a haptic element of variable eccentricity. As described, a rotating mass may include a movable part that may alter the center of mass of the rotating mass. In some embodiments, the movement of movable part may be forcibly limited by a retaining feature such as a spring, elastomer, electromagnet, permanent magnet, or piston and the like. The retaining element may exert a centripetal force on the mass element as it rotates. At a sufficient angular velocity, the centripetal force may be overcome and the movable part may extend outwardly from the shaft, immediately shifting the center of mass of the mass element away from the axis of rotation. The movable part may extend a rectilinear or arcuate path to a fixed or variable distance away from the axis of rotation.

Figure 9A:
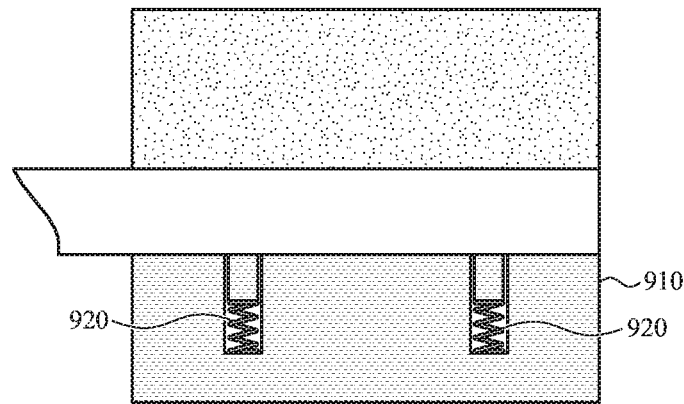
FIG. 9A is a top plan view of the sample haptic element of FIG. 2 taken along line 9-9, showing a rotating mass held in an axially balanced state by two springs under tension.
Figure 9B:
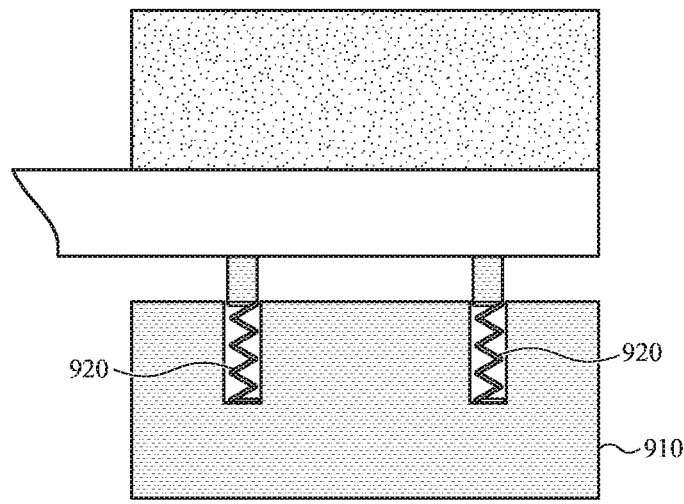
FIG. 9B is a top plan view of the sample haptic element of FIG. 9A showing the rotating mass in an eccentric state.

FIG. 9A and FIG. 9B show a top plan view of the sample haptic element of FIG. 2 taken along line 9-9, showing a rotating mass 910 held in an axially balanced state by two springs 920 under tension. One may appreciate that the tension of the springs 920 correlates to the amount of retaining force the springs may provide to keep the movable mass 910 in the concentric position.

Figure 10:
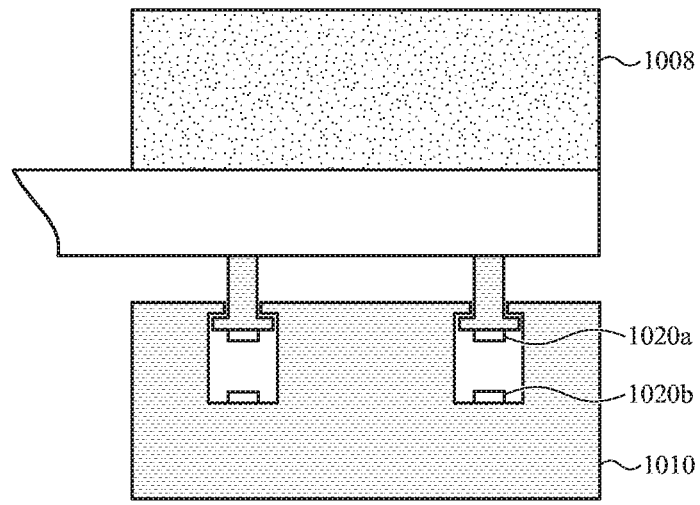
FIG. 10 is a top plan view of an alternate exemplary haptic element related to FIG. 2 taken along line 9-9, showing a rotating mass in an eccentric state.

In other embodiments, the retaining feature may include a permanent magnet or electromagnet, such as the embodiment shown in FIG. 10. In a first embodiment, a magnet 1020a may be fixedly coupled to the rotating shaft. A complementary magnet 1020b may be fixedly coupled to the movable mass 1010. The magnet portions 1020a, 1020b may be oriented to attract to one another such that with a low angular velocity, the movable mass 1010 may be retained in a concentric position.

One may appreciate that the mass of the movable element 1010 may be slightly less than a fixed element 1008 due to the internal geometry necessary to receive the retaining feature. In some embodiments, the fixed element 1008 may be constructed of a different material than the movable element 1010 to account for the difference in mass resulting from the difference in geometry. In other embodiments, the geometry of the fixed element 1008 may be augmented to account for the reduced mass of the movable element 1010.

Figure 11:
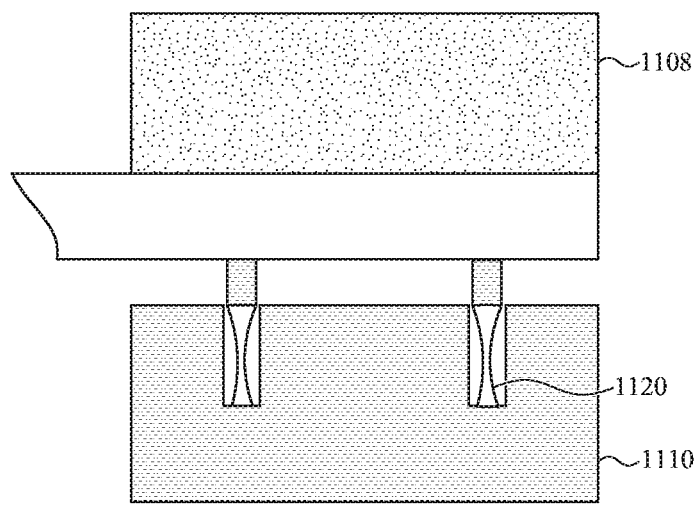
FIG. 11 is a top plan view of an alternate exemplary haptic element related to FIG. 2 taken along line 9-9, showing a rotating mass in an eccentric state.

In other embodiments, alternate retaining features may be provided. For example, FIG. 11 showing a retaining element 1120 comprised of an elastomer. The elasticity of the elastomer selected may vary from embodiment to embodiment.

Figure 12A:
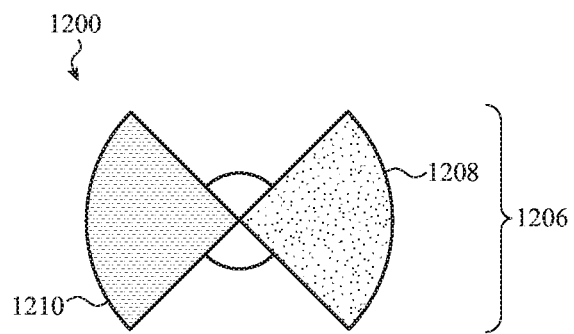
FIG. 12A is a side plan view of the sample haptic element showing a rotating mass held in an axially balanced state.
Figure 12B:
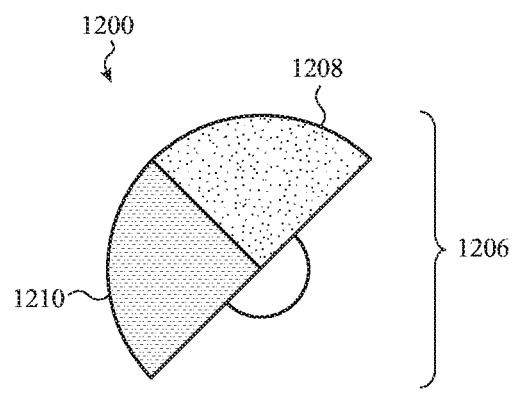
FIG. 12B is a side plan view of the sample haptic element showing the rotating mass of FIG. 11A in an eccentric state.

In other embodiments, a first mass portion and a second mass portion may be included in a rotating mass of varying eccentricity. In these and related embodiments, the first mass portion may be rigidly coupled to the shaft whereas the second mass portion may be configured to pivot about the shaft. For example, FIG. 12A shows a side plan view of a sample haptic element 1200, showing a rotating mass 1206 composed of two mass portions 1208, 1210 held in an axially balanced state about the axis of rotation. At a selected angular velocity, or at a selected time, the mass portions 1208, 1210 may pivot to interface one another as shown in FIG. 12B.

Figure 13:
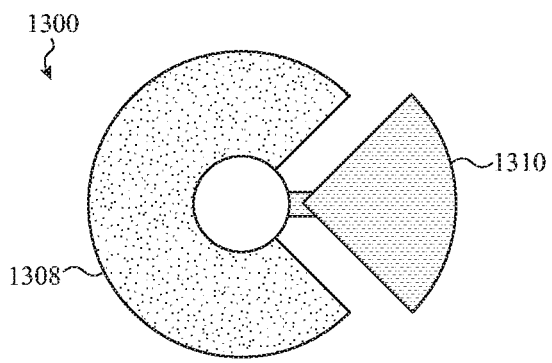
FIG. 13 is a side plan view of a sample haptic element showing a rotating mass held in an eccentric state.

In still other embodiments, a first mass portion and a second mass portion may be included in a rotating mass of varying eccentricity having unequal masses. For example, FIG. 13 shows a top plan view of a sample haptic element 1300, showing a rotating mass composed of two mass portions 1308, 1310 held in an eccentric state about the axis of rotation. At a selected angular velocity the mass portion 1310 may extend outwardly a selected distance to shift the center of mass. The mass portions 1308, 1310 may have unequal geometries and may have unequal masses.

Figure 14:
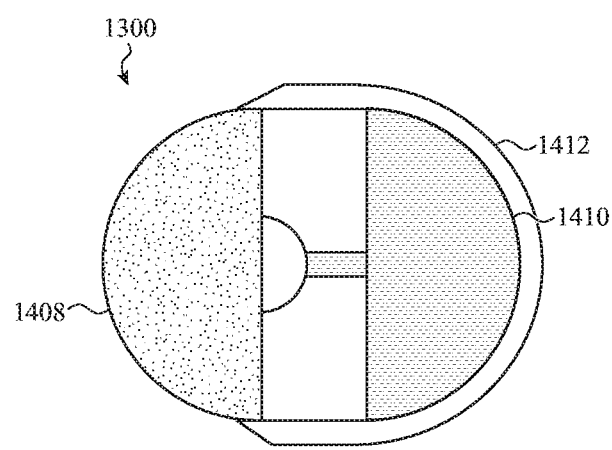
FIG. 14 is a side plan view of a sample haptic element showing a rotating mass held in an eccentric state.

In further examples, the movement of the movable mass portion may be defined at least in part by an outward motion limiter such as a band, basket, or hoop. For example, FIG. 14 shows a top plan view of a sample haptic element 1400, showing a rotating mass composed of two mass portions 1408, 1410 held in an eccentric state about the axis of rotation. Also depicted is an outward motion limiter 1412, fixed to the mass portion 1408 and positioned a certain distance outwardly from the shaft. The outward motion limiter 1412 may catch the mass portion 1410 as it extends outwardly.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A haptic element comprising:
a motor comprising a shaft; and
a mass element coupled to the shaft comprising:
a first operational configuration associated with a first angular velocity range of the shaft wherein a center of mass of the mass element is concentrically aligned with the shaft; and
a second operational configuration associated with a second angular velocity range of the shaft wherein the center of mass of the mass element is eccentrically aligned with the shaft.

2. The haptic element of claim 1, wherein the mass element comprises a first mass portion and a second mass portion, wherein:
the first mass portion is rigidly coupled to the shaft; and
the second mass portion is configured to move outwardly from the shaft.

3. The haptic element of claim 2, wherein in the first operational configuration, the second mass portion is positioned to interface the first mass portion along the shaft.

4. The haptic element of claim 2, wherein in the second operational configuration, the second mass portion is positioned a select distance from the shaft and the first mass portion.

5. The haptic element of claim 4, wherein the select distance is defined at least in part by a movable coupling.

6. The haptic element of claim 5, wherein the movable coupling comprises at least one of a spring, an elastomer, an electromagnet, a permanent magnet, and a piston.

7. The haptic element of claim 4, wherein the select distance is defined at least in part by an outward motion limiter.

8. The haptic element of claim 1, further comprising a third operational configuration associated with a third angular velocity range of the shaft greater than the first angular velocity range, wherein the center of mass of the mass element is concentrically aligned with the shaft.

9. The haptic element of claim 1, wherein the mass element comprises a first mass portion and a second mass portion, wherein:
the first mass portion is rigidly coupled to the shaft; and
the second mass portion is configured to pivot about the shaft.

10. The haptic element of claim 9, wherein in the first operational configuration, the second mass portion pivots to diametrically oppose the first mass portion about the shaft.

11. The haptic element of claim 9, wherein in the second operational configuration, the second mass portion pivots to interface the first mass portion.

12. A haptic feedback apparatus comprising:
a mass element coupled to a driver motor and comprising:
a nonhaptic mode associated with an angular velocity range of the driver motor; and
a haptic mode associated with a threshold angular velocity of the driver motor;
wherein:
the threshold angular velocity defines an upper bound of a threshold angular velocity range.

13. An electronic device comprising:
a housing;
a haptic element coupled to the housing and comprising:
a motor comprising a shaft; and
a mass element coupled to the shaft and comprising:
a first operational configuration associated with a first angular velocity range of the shaft wherein a center of mass of the mass element is concentrically aligned with the shaft; and
a second operational configuration associated with a second angular velocity range of the shaft wherein the center of mass of the mass element is eccentrically aligned with the shaft.

14. The electronic device of claim 13, wherein the mass element comprises a first mass portion and a second mass portion, wherein:
the first mass portion is rigidly coupled to the shaft; and
the second mass portion is configured to move outwardly from the shaft.

15. The electronic device of claim 14, wherein in the first operational configuration, the second mass portion is positioned to interface the first mass portion along the shaft.

16. The electronic device of claim 14, wherein in the second operational configuration, the second mass portion is positioned a select distance from the shaft and the first mass portion.

17. The electronic device of claim 16, wherein the select distance is defined at least in part by a movable coupling.

18. The electronic device of claim 17, wherein the movable coupling comprises at least one of a spring, an elastomer, an electromagnet, a permanent magnet, and a piston.

19. The electronic device of claim 16, wherein the select distance is defined at least in part by an outward motion limiter.

20. The electronic device of claim 13, further comprising a third operational configuration associated with a third angular velocity range of the shaft greater than the first angular velocity range wherein the center of mass of the mass element is concentrically aligned with the shaft.

21. A method of providing haptic feedback comprising:
spinning a shaft of a motor to a first angular velocity, the motor comprising a mass element coupled to the shaft, the mass element having a center of mass that is concentrically aligned with the shaft when the motor operates in a first mode; and
causing the center of mass of the mass element to eccentrically align with the shaft upon spinning the motor to a second angular velocity when the motor operates in a second mode.

22. The method of claim 21, further composing:
slowing the shaft of the motor to the first angular velocity to transition from the second mode to the first mode.

23. The method of claim 21, further comprising:
spinning the shaft of the motor to a third angular velocity; and
causing the center of mass of the mass element to concentrically align with the shaft.

* * * * *